US008447482B2

(12) United States Patent
Tomoda

(10) Patent No.: US 8,447,482 B2
(45) Date of Patent: May 21, 2013

(54) SHIFT CONTROL DEVICE AND VEHICLE

(75) Inventor: Akihiko Tomoda, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 902 days.

(21) Appl. No.: 12/487,972

(22) Filed: Jun. 19, 2009

(65) Prior Publication Data
US 2010/0185371 A1 Jul. 22, 2010

(30) Foreign Application Priority Data

Jul. 8, 2008 (JP) ................................. 2008-177944

(51) Int. Cl.
G06F 19/00 (2011.01)
B60W 10/02 (2006.01)

(52) U.S. Cl.
USPC .................. 701/67; 701/64; 477/62; 477/174

(58) Field of Classification Search
USPC ......................................................... 701/64
See application file for complete search history.

(56) References Cited

U.S. PATENT DOCUMENTS

| 7,108,633 | B2 * | 9/2006 | Hasegawa et al. | 477/70 |
| 7,341,541 | B2 * | 3/2008 | Houtman et al. | 477/180 |
| 7,676,315 | B2 * | 3/2010 | Doering et al. | 701/87 |
| 7,881,847 | B2 * | 2/2011 | Zenno | 701/67 |
| 2007/0244617 | A1 * | 10/2007 | Zenno | 701/67 |
| 2008/0196989 | A1 * | 8/2008 | Petzold et al. | 192/31 |
| 2011/0295475 | A1 * | 12/2011 | Shimizu et al. | 701/66 |

FOREIGN PATENT DOCUMENTS

| DE | 10 2005 019 790 A1 | 12/2005 |
| DE | 10 2006 054 021 A1 | 5/2008 |
| JP | 2006-83946 A | 3/2006 |

* cited by examiner

Primary Examiner — Thomas Black
Assistant Examiner — Wae Louie
(74) Attorney, Agent, or Firm — Birch, Stewart, Kolasch & Birch, LLP

(57) ABSTRACT

A shift control device includes a clutch for performing a connection/disconnection of power transmitted to a drive wheel from an engine based on an operation input to a shift operator, an actuator for performing a drive control of the clutch, and a controller for controlling the driving of the actuator. The controller includes an operation quantity detector for detecting an operation quantity of a shift operator, a shift starter performing a control toward the disengagement of the clutch by driving the actuator at a stage in which an operation quantity detected by the operation quantity detector exceeds a first threshold value, and a shift starter for performing a disengagement control of the clutch by driving the actuator at a stage wherein an operation quantity detected by the operation quantity detector exceeds a second threshold value which is larger than the first threshold value.

20 Claims, 10 Drawing Sheets

SHIFT CONTROL DEVICE AND VEHICLE

CROSS-REFERENCE TO RELATED APPLICATIONS

The present application claims priority under 35 USC 119 to Japanese Patent Application No: 2008-177944 filed on Jul. 8, 2008 the entire contents of which are hereby incorporated by reference.

BACKGROUND OF THE INVENTION

1. Field of the Invention

The present invention relates to a shift control device which controls an operation of an actuator which performs a drive control of a clutch for connecting or disconnecting power transmitted to a drive wheel from an engine, and a vehicle which includes the shift control device.

2. Description of Background Art

Conventionally, a shift control device is known for automatically performing a clutch operation and a gear shift operation on a motorcycle that is provided with a multi-position shift gear. The shift control device realizes an automatic shift control by performing a clutch operation and a gear shift operation using an actuator respectively. See, for example, JP-A-2006-083946.

According to the shift control device disclosed in JP-A-2006-083946, a speed at which a clutch is shifted from a clutch disengagement state to a clutch engagement state is changed in response to a shift position for shortening the time necessary for a shift operation thus enabling a smooth and rapid shift operation.

In a shift control which is performed at the time of shift operation, a clutch in an engagement state is first disengaged. Thereafter, a series of operations for reengagement is performed. To shorten the time necessary for the shift operation, there has been a demand for shortening the time necessary for disengaging the clutch in addition to a demand for shortening the time for engaging the clutch.

SUMMARY AND OBJECTS OF THE INVENTION

The present invention has been made in view of such a task. It is an object of an embodiment of the present invention to provide a shift control device for a vehicle which can further shorten the time necessary for disengaging a clutch from a point in time wherein a shift instruction is made thus enabling a rapid and smooth shift change.

According to an embodiment of the present invention, a shift control device includes an engine, a transmission for transmitting power generated by the engine to a drive wheel, a shift operation means for a rider to operate so as to change the shift position of the transmission, a clutch for connecting/disconnecting the power transmitted to the drive wheel from the engine, an actuator which performs an engagement/disengagement operation of the clutch, and a control means which controls driving of the actuator, wherein the control means includes an operation quantity detection means for detecting an operation quantity of the shift operation means. A shift start preparation means is provided for driving the actuator at a stage wherein an operation quantity detected by the operation quantity detection means exceeds a first threshold value so as to perform a control which brings the clutch into a predetermined position between an engagement position and a half clutch position. A shift start means is provided for driving the actuator at a stage wherein the operation quantity detected by the operation quantity detection means exceeds a second threshold value larger than the first threshold value so as to perform the disengagement of the clutch.

Due to such constitution, in the shift operation performed by a rider, when the shift operation enters a state at which the operation quantity detected by the operation quantity detection means exceeds the first threshold valve, that is, a stage at which it is determined that a will of a rider to perform a shift operation is high, the shift start preparation means drives the actuator so as to perform a control for bringing the clutch into a predetermined position between the engagement position and the half clutch position. Accordingly, the shift control device can rapidly shift the clutch to the next disengagement state while maintaining the engagement state of the clutch. Further, even when the shift operation is not performed by the rider, the disengagement of the clutch can be prevented. Accordingly, time necessary for disengaging a clutch from a point in time wherein a shift instruction is made can be shortened. Thus, it is possible to provide a system for performing the shift change rapidly and smoothly and for effectively avoid an erroneous operation. Further, when the shift operation means is not operated at all, the shift start preparation means and the shift start means are not operated. Thus, there is no wasteful operation whereby the power consumption can be effectively reduced.

In the shift control device according to an embodiment of the present invention, the shift control device further includes a rotational speed sensor for detecting a rotational speed of the engine and a throttle opening sensor for detecting the opening of a throttle, wherein the predetermined position is set based on at least a detection value of the rotational speed sensor and a detection value of the throttle opening sensor.

In the shift control device according to an embodiment of the present invention, the shift operation means is a shift pedal which is operated by a foot of the rider or a shift lever which is operated by a hand of the rider, and the operation quantity detection means detects one of an operational displacement distance, an operational displacement angle and an operational force of the shift operation means. Due to such construction, it is possible to easily apply the shift control device to a two-wheeled vehicle which allows a rider to performs a using his/her foot and a four-wheeled vehicle which allows a rider to performs a shift operation using his/her hand.

In the shift control device according to an embodiment of the present invention, the shift control device further includes a hydraulic pipe which connects the actuator and the clutch, and a liquid pressure sensor which detects a liquid pressure value in the hydraulic pipe, wherein an operational force of the actuator is transmitted to the clutch by way of liquid pressure in the hydraulic pipe, and the predetermined position is determined in response to liquid pressure value detected by the liquid pressure sensor.

Due to such a construction, the shift control device acquires an advantage that an operational force of the actuator is hardly influenced by the wear of the clutch.

In this case, assuming the liquid pressure value corresponding to an engagement position of the clutch is at a first liquid pressure value, the liquid pressure value corresponding to a disengagement position of the clutch is at a second liquid pressure value, the liquid pressure value corresponding to a predetermined position is at a third liquid pressure value, and a liquid pressure value at which a frictional torque of the clutch becomes equal to a torque which the engine generates is at a fourth liquid pressure value, the third liquid pressure value is a liquid pressure value between the first liquid pressure value and the fourth liquid pressure value, and is a liquid pressure value different from the first liquid pressure value and the fourth liquid pressure value.

Due to such a construction, the liquid pressure value (the third liquid pressure value) in the hydraulic pipe when the clutch is at a predetermined position is set to a value closer to the liquid pressure value (second liquid pressure value) when the clutch is at the disengagement position than to the liquid pressure value (the first liquid pressure value) when the clutch is at the engagement position. Accordingly, a drive quantity of the actuator for disconnecting the power by the clutch can be decreased. More specifically, the time necessary for disconnecting power using the clutch can be shortened.

Further, the liquid pressure value (the third liquid pressure value) when the clutch is at a predetermined position is set to a liquid pressure value at which a friction torque of the clutch is larger than an engine torque. Accordingly, when the shift start is not performed in spite of the preparation of the shift start, the normal traveling control state is smoothly continued as it is. Thus, there is no possibility of the generation of oscillations or the like attributed to the preparation of the shift start preparation.

A vehicle according to another embodiment of the present invention includes the shift control device of the above-mentioned embodiment of the present invention.

As has been explained heretofore, according to the shift control device and the vehicle of an embodiment of the present invention, the time necessary for disengaging a clutch from a point in time wherein a shift instruction is made can be shortened whereby the shift change can be rapidly and smoothly performed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
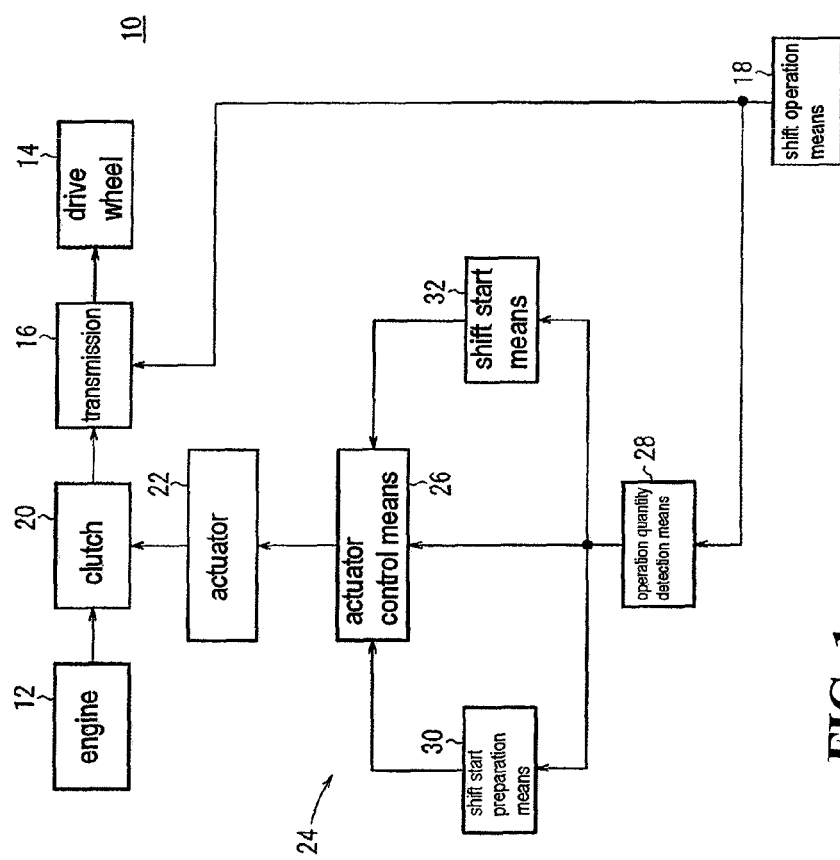
FIG. 1 illustrates a block diagram showing a vehicle provided with a shift control device according to a mode for carrying out the present invention.

Hereinafter, one mode for carrying out a shift control device and a vehicle according to the present invention is explained in conjunction with FIG. 1 to FIG. 10. In this embodiment, the vehicle includes a four-wheeled vehicle and a motorcycle.

The vehicle according to this mode for carrying out the present invention is provided with a shift control device 10. The shift control device 10 includes, as shown in FIG. 1, an engine 12, a transmission 16 for transmitting power generated by the engine 12 to a drive wheel 14, a shift operation means 18 for a rider to operate so as to change a shift position of the transmission 16, a clutch 20 which connects/disconnects the power transmitted to the drive wheel 14 from the engine 12, an actuator 22 for generating power for engaging/disengaging the clutch 20, and a control means 24 for controlling driving of the actuator 22.

In such a vehicle, in response to a shift instruction which is generated when a rider directly operates a shift pedal (two-wheeled vehicle) or a shift lever (four-wheeled vehicle), a shift operation is performed. That is, the disengagement of the clutch 20, the change of the shift position and the engagement of the clutch 20 are performed in this order.

Figure 2A:
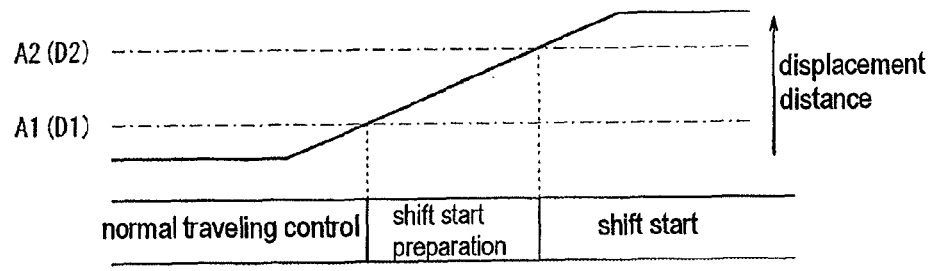
FIG. 2A is a timing chart showing the timing of a shift start preparation control and the timing of a shift start control based on an operational displacement distance of a shift operation means.
Figure 2B:
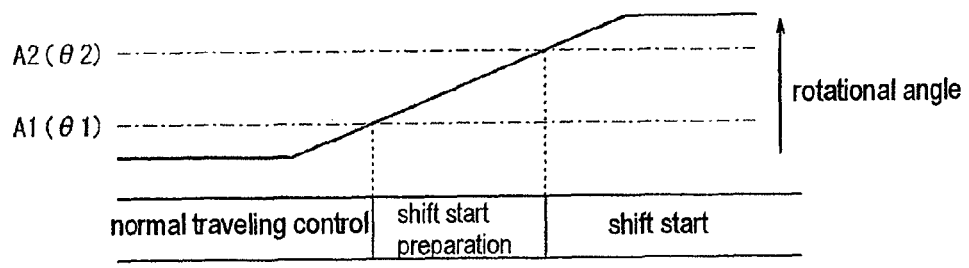
FIG. 2B is a timing chart showing the timing of a shift start preparation control and the timing of a shift start control based on an operation rotational angle of the shift operation means.
Figure 2C:
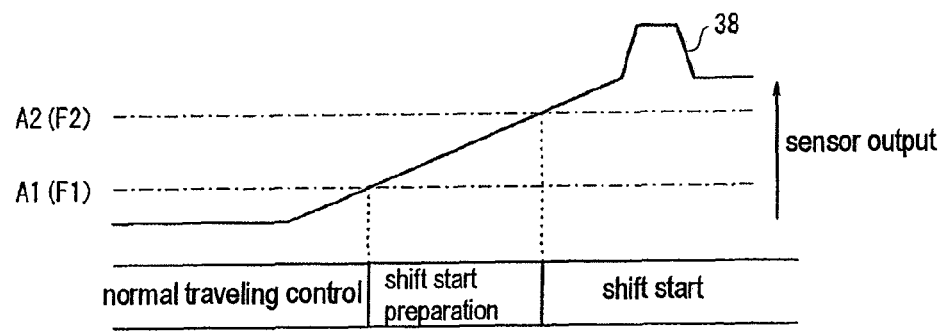
FIG. 2C is a timing chart showing the timing of a shift start preparation control and the timing of shift start control based on an operational force of the shift operation means.

Further, as shown in FIG. 1, the control means 24 includes an actuator control means 26, an operation quantity detection means 28 for detecting an operation quantity of the shift operation means 18, a shift start preparation means 30 for instructing the actuator control means 26 to control the shift operation toward the disengagement of the clutch 20 at a stage wherein an operation quantity detected by the operation quantity detection means 28 exceeds a first threshold value A1 (see FIG. 2A to FIG. 2C). A shift start means 32 is provided for instructing the actuator control means 26 to perform the disengagement of the clutch 20 at a stage wherein the operation quantity detected by the operation quantity detection means 28 exceeds a second threshold value A2 (see FIG. 2A to FIG. 2C) larger than the first threshold value A1. Here, "to control the shift operation toward the disengagement of the clutch 20" does not imply a control for actually disengaging the clutch 20 but implies a control for bringing the clutch 20 into a state immediately before the disengagement of the clutch 20 (preparation state).

In such a case, in the shift operation performed by a rider, when the shift operation enters a stage at which the operation quantity detected by the operation quantity detection means 28 exceeds the first threshold value A1, that is, a stage at which it is determined that a will of a rider to perform a shift operation is high, the actuator 22 is driven in response to an instruction from the shift start preparation means 30 so that a control toward the disengagement of the clutch 20 is performed. Accordingly, the time necessary for disengaging the clutch 20 from a point in time wherein the shift instruction is made by a rider can be shortened thus enabling a rapid and smooth shift change. Further, when the shift operation means 18 is not operated at all, the shift start preparation means 30 and the shift start means 32 are not operated. Thus, there is no wasteful operation whereby the power consumption can be also effectively reduced.

The first threshold value A1 is preferably set to a value not less than 20% and not more than 30% of the second threshold value A2. By setting the first threshold value A1 to such a value, for example, when a shift pedal is used as the shift operation means 18, the actuator 22 is not driven in a state wherein the rider merely puts his/her foot on the shift pedal, and the actuator 22 can be driven only when the probability of a will of the rider to perform a shift operation is high. Accordingly, the power consumption of the actuator 22 can be reduced.

Further, the shift operation means 18 is a shift pedal which is operated by a foot of the rider when the vehicle is a two-wheeled vehicle, and the shift operation means 18 is a shift lever which is operated by a hand of a rider when the vehicle is a four-wheeled vehicle.

The operation quantity detection means 28 is configured to detect any one of an operational displacement distance, an operational displacement angle and an operational force of the shift operation means 18.

In this case, when the shift operation means 18 adopts a mechanism which transmits an operational force by way of a piston, as shown in FIG. 2A, a displacement distance of the piston is an operation quantity of the shift operation means 18. At a stage wherein the displacement distance exceeds a first threshold value A1 (first displacement distance D1), the actuator 22 is driven in response to an instruction from the shift start preparation means 30 so that a control toward the disengagement of the clutch 20 (shift start preparation control) is performed. At a stage wherein the displacement distance exceeds a second threshold value A2 (second displacement distance D2), the actuator 22 is driven in response to an instruction from the shift start means 32 so that the clutch is disengaged (shift start control).

When the shift operation means 18 is a mechanism which is rotated about a support shaft, for example, as shown in FIG. 2B, a rotational angle of the shift operation means 18 becomes an operation quantity. At a stage that the rotational angle exceeds a first threshold value A1 (first displacement angle θ1), the shift start preparation means 30 controls the actuator 22 (shift start preparation control). At a stage that the rotational angle exceeds a second threshold value A2 (second displacement angle θ2), the shift start means 32 controls the actuator 22 (shift start control).

Further, when the shift operation means 18 is of a type which detects an operational force using a load sensor, as shown in FIG. 2C, an output (sensor output) from the load sensor is an operation quantity of the shift operation means 18. At a stage that the sensor output exceeds a first threshold value A1 (first sensor output F1), the shift start preparation means 30 controls the actuator 22 (shift start preparation control), and at a stage that the sensor output exceeds a second threshold value A2 (second sensor output F2), the shift start means 32 controls the actuator 22 (shift start control).

In FIG. 2C, a convex-shaped waveform 38 shows a state wherein pressure which is generated at a moment when a plurality of drive friction discs which are mounted on a clutch outer and a plurality of driven friction discs which are mounted on a clutch inner are separated from each other and pressure is applied to the load sensor.

Further, as a control method of the shift start preparation means 30, there are following two methods (first method and second method.)

The first method uses a position sensor which detects a position of an operational member of the actuator 22 and is applicable to a mechanism in which an operational force corresponding to a position of the operational member of the actuator 22 is transmitted to the clutch 20.

Figure 3:
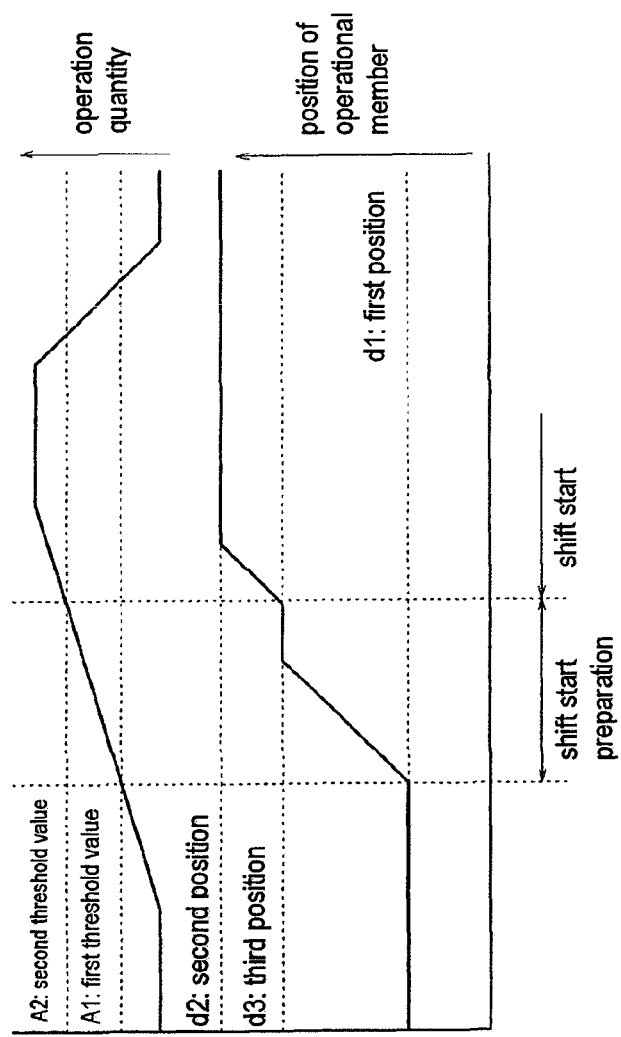
FIG. 3 illustrates a timing chart showing the operation start timing of a shift start preparation part by a first method (a position of an operational member of an actuator)

Further, as shown in FIG. 3, assuming a position of the operational member at which a friction torque of the clutch 20 becomes maximum as a first position d1 and assuming a position of the operational member at which the friction torque of the clutch 20 becomes substantially 0 as a second position d2, the shift start preparation means 30 performs a control so as to allow the operational member to take a third position d3 (preset position) which is set between the first position d1 and the second position d2 and differs from the first position d1 and the second position d2. To be more specific, the shift start preparation means 30 controls the actuator 22 based on a detection value from the position sensor such that the operational member takes the third position d3.

Figure 5:
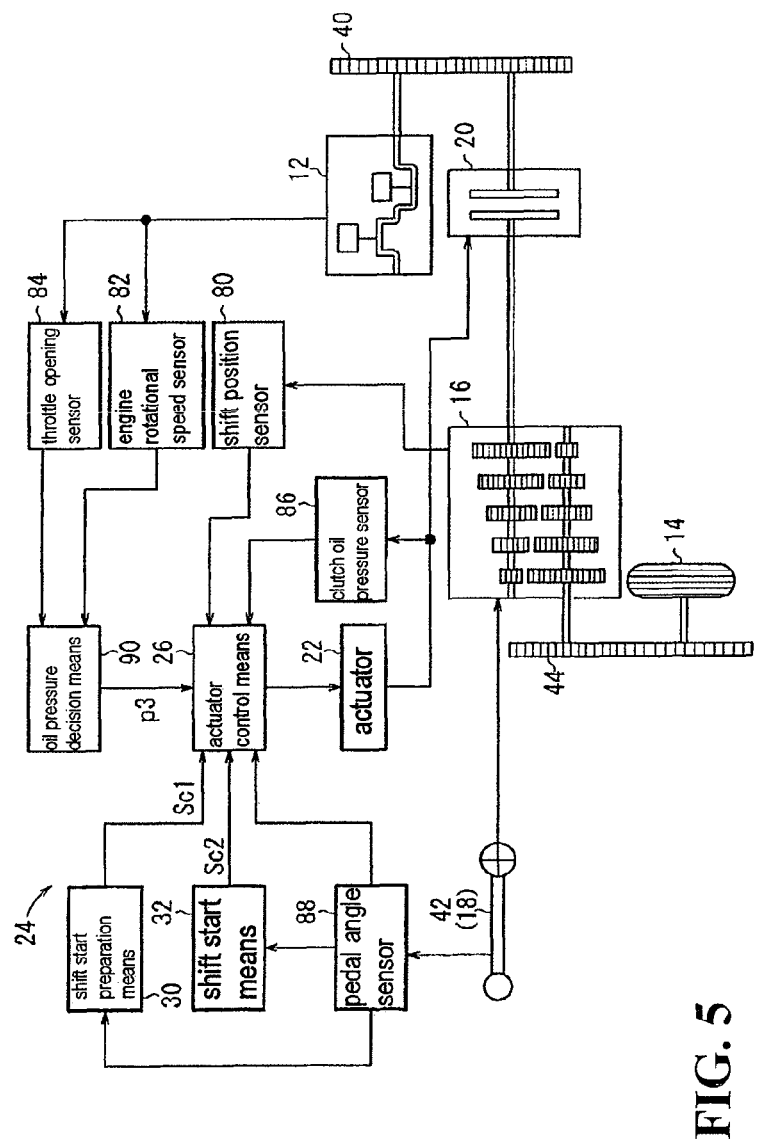
FIG. 5 illustrates a constitutional view showing a vehicle which is provided with a shift control device of an embodiment.

To explain the setting of the third position d3 also in conjunction with FIG. 5, when the vehicle includes an engine rotational speed sensor 82 for detecting a rotational speed of the engine 12 and a throttle opening sensor 84 for detecting an opening of a throttle, the third position d3 is set based on at least a detection value from the engine rotational speed sensor 82 and a detection value from the throttle opening sensor 84. In addition, the third position d3 may be set based on a currently-set shift position.

A position (third position d3) of the operational member of the actuator 22 when the starting of shift is in a preparation state by the shift start preparation means 30 is arranged closer to the position (second position d2) of the operational member when the clutch 20 is disengaged due to the starting of the shift operation than to the position (first position d1) of the operational member when the shift operational member 18 is not operated. Thus, an operational quantity of the actuator 22 for disengaging the clutch 20 can be decreased. That is, time for disengaging the clutch 20 can be shortened.

More particularly, the third position d3 is set based on a detection value from the engine rotational speed sensor 82 and the detection value from the throttle opening sensor 84. Thus, it is possible to push the clutch 20 with a pushing force corresponding to an engine torque calculated based on the respective detection values. Accordingly, even when the operational member of the actuator 22 is set at the third position d3, it is possible to prevent sliding of the clutch 20.

On the other hand, the second method of the shift start preparation means 30 is applicable to a case in which the shift start preparation member 30 adopts a mechanism for transmitting a drive force of the actuator 22 to the clutch 20 by way of an oil pressure in a hydraulic pipe 46 (see FIG. 6) and the shift start preparation means 30 includes a clutch oil-pressure sensor 86 (see FIG. 5) which detects an oil pressure value in the hydraulic pipe 46.

Figure 4:
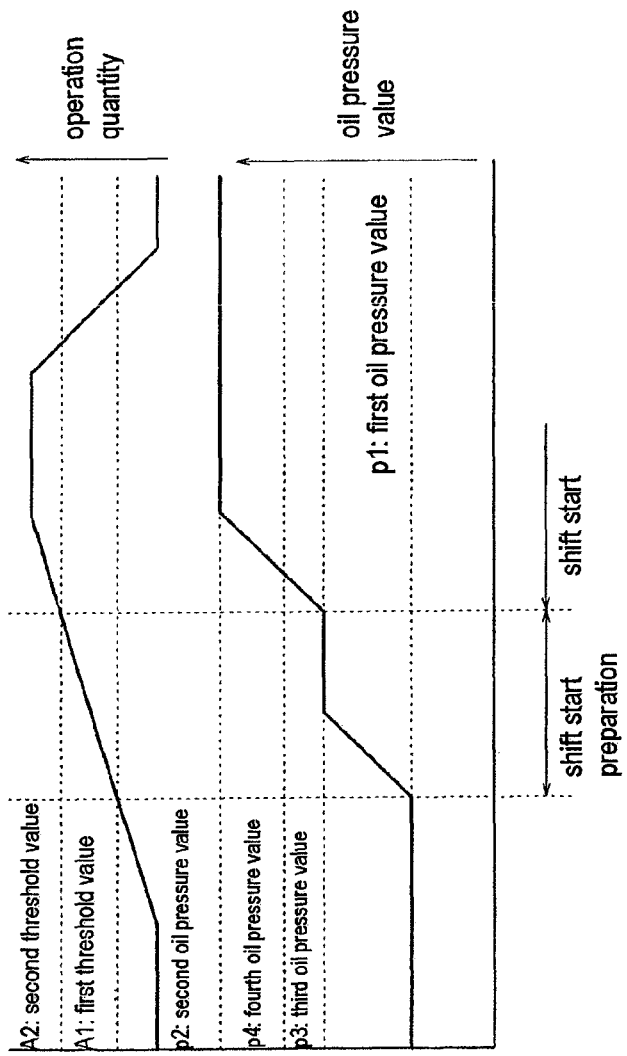
FIG. 4 illustrates a timing chart showing the operation start timing of the shift start preparation part by a second method (an oil pressure value in a hydraulic pipe)

Further, as shown in FIG. 4, assuming an oil pressure value at which a friction torque of the clutch 20 becomes maximum as a first oil pressure value p1 and assuming an oil pressure value at which the friction torque of the clutch 20 becomes substantially 0 as a second oil pressure value p2, the shift start preparation means 30 controls the oil pressure value in the hydraulic pipe 46 so as to allow the oil pressure value to take a third oil pressure value (preset oil pressure value) which is an oil pressure valve between the first oil pressure value p1 and the second oil pressure value p2 and differs from the first oil pressure value p1 and the second oil pressure value p2. To be more specific, the shift start preparation means 30 controls the actuator 22 based on a detection value from the clutch oil pressure sensor 86 such that the oil pressure value in the hydraulic pipe 46 takes the third oil pressure value p3.

To explain the setting of the third oil pressure value p3 also in conjunction with FIG. 5, when the vehicle includes the engine rotational speed sensor 82 which detects a rotational speed of the engine 12 and the throttle opening sensor 84 which detects the opening of the throttle, the third oil pressure value p3 is set based on at least a detection value from the engine rotational speed sensor 82 and a detection value from the throttle opening sensor 84. In addition, the third oil pressure value p3 may be set based on a currently-set shift position.

More particularly, assuming an oil pressure value at which a friction torque of the clutch 20 becomes equal to a torque generated by the engine as a fourth oil pressure value p4 (<second oil pressure value p2), the third oil pressure value p3 is set to an oil pressure value which is between the first oil pressure value p1 and the fourth oil pressure value p4 and differs from the first oil pressure value p1 and the fourth oil pressure value p4.

Accordingly, the oil pressure value (third oil pressure value p3) in the hydraulic pipe 46 when the shift start is in a preparation state by the shift start preparation means 30 is closer to an oil pressure value (second oil pressure value p2) in the hydraulic pipe 46 when the clutch 20 is disengaged due to the shift start than to the oil pressure value (first oil pressure value p1) in the hydraulic pipe 46 when the shift operation means 18 is not operated. Thus, a drive quantity of the actuator 22 for disengaging the clutch 20 can be decreased. More specifically, time for disengaging the clutch 20 can be shortened.

Further, as described above, by setting the third oil pressure value p3 to the oil pressure value between the first oil pressure value p1 and the fourth oil pressure value p4, the third oil pressure value p3 is set to an oil pressure value at which the friction torque of the clutch 20 becomes larger than the engine torque even during a period in which the actuator 22 is driven by the shift start preparation means 30. Accordingly, even when the shift start is not performed after the shift start in spite of the preparation of the shift start, a normal traveling control state is smoothly continued as it is. Thus, there is no possibility of the generation of vibrations or the like caused by the shift start preparation.

As described above, the shift control device 10 according to the mode for carrying out the present invention and the vehicle which includes the shift control device 10 can shorten the time which elapses from a point in time that the rider instructs the shift operation to a point in time wherein the clutch 20 is disengaged. Thus, the shift control device 10 and the vehicle can perform the shift change rapidly and smoothly.

An embodiment of the present invention in which the shift control device 10 according to the mode for carrying out the present invention is applied to a motorcycle is hereinafter explained. In the shift control device 10 according to this embodiment, the shift start preparation means 30 adopts the second method (method which uses the oil pressure).

The shift control device 10 according to the embodiment which is applied to the motorcycle includes, as shown in FIG. 5, an engine 12, primary speed reduction gears 40 for transmitting a drive force of the engine 12, a clutch 20 for performing a connection/disconnection of power transmitted to a drive wheel 14 from the engine 12, a transmission 16 for selectively changing a plurality of shift positions by rotating a shift drum not shown in the drawing, a shift pedal 42 (shift operation means 18) for changing the shift positions of the transmission 16 in response to an operation of a rider, a drive chain 44 for transmitting a drive force from the transmission 16 to the drive wheel 14, an actuator 22 for controlling the engagement/disengagement of the clutch 20, and a control means 24 for controlling the driving of the actuator 22.

Figure 6:
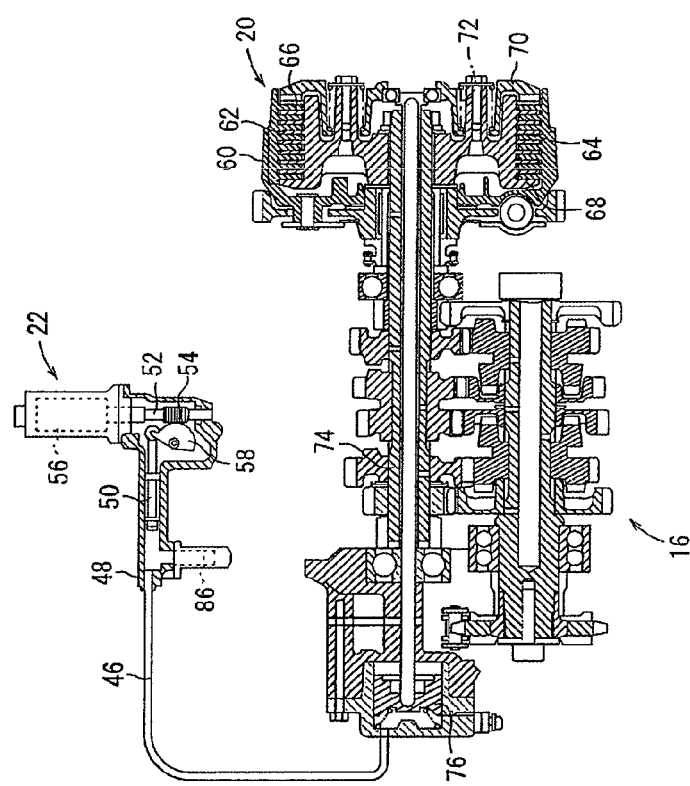
FIG. 6 illustrates an enlarged view showing an actuator and a mechanism part of a clutch in the vehicle according to the embodiment.

The actuator 22 includes, as shown in FIG. 6, a master cylinder 48 which is connected to a hydraulic pipe 46, a master piston 50 which slides in the inside of the master cylinder 48, a motor 56 which fixedly mounts a worm gear 54 on a rotary shaft 52 thereof, and a sector-shaped worm wheel gear 58 to which a drive force of the motor 56 is transmitted via the worm gear 54. When the motor 56 is rotated in the normal direction, one end of the worm wheel gear 58 pushes one end of the master piston 50, for example. Accordingly, the master piston 50 slides toward the hydraulic pipe 46 side so that an oil pressure (clutch oil pressure) in the hydraulic pipe 46 is elevated. To the contrary, when the motor 56 is rotated in the reverse direction, the master piston 50 slides toward the rotary shaft 52 side of the motor 56 so that the clutch oil pressure in the hydraulic pipe 46 is lowered.

The clutch 20, as shown in FIG. 6, transmits the drive force by making use of a friction force generated between a plurality of drive friction discs 62 mounted on a clutch outer 60 and a plurality of driven friction discs 66 mounted on a clutch inner 64. The drive friction disc 62 and the driven friction disc 66 are alternately arranged between a pressure receiving plate 68 formed on one end of the clutch inner 64 and a pressure applying plate 70.

The pressure applying plate 70 is biased by a clutch spring 72 arranged between the pressure applying plate 70 and the clutch inner 64. The pressure applying plate 70 pushes the drive friction discs 62 and the driven friction discs 66 together due to the biasing force and generates a friction force proportional to a biasing force. The stronger the biasing force is, the stronger the friction force becomes so that a friction torque is increased.

Further, the pressure applying plate 70 is rotatably joined to a slave piston 76 by way of a push rod 74. The slave piston 76 is connected to the master cylinder 48 of the actuator 22 by way of the hydraulic pipe 46. Accordingly, a force is applied to the slave piston 76 due to the elevation of the clutch oil pressure acts so as to decrease the biasing force applied to the pressure applying plate 70 by the clutch spring 72. Accordingly, when the clutch oil pressure is 0, the biasing force applied to the pressure applying plate 70 is the highest, that is, the friction torque is the highest (implying an engagement state). Along with the elevation of the clutch oil pressure, the biasing force is decreased so that the friction torque is decreased. When the clutch oil pressure becomes a predetermined value or more, the biasing force becomes 0, that is, the friction torque becomes 0 (implying a disengagement state).

In this manner, the clutch 20 can perform the engagement/disengagement thereof corresponding to the clutch oil pressure generated by the actuator 22 which is controlled by the shift control device 10. The transmission 16 is of a meshing dog type which can select a gear change ratio at a plurality of positions. The gear change ratio is set to arbitrary positions including a neutral position by a shift pedal 42 which is operated by a rider.

The shift control device 10 changes a control state in response to respective values from a shift position sensor 80 for detecting a shift position of the transmission 16, an engine rotational speed sensor 82 for detecting a rotational speed of the engine 12, a throttle opening sensor 84 for detecting a throttle opening, a clutch oil pressure sensor 86 for detecting a clutch oil pressure for engaging/disengaging the clutch 20, and a pedal angle sensor 88 for detecting a pedal angle of the shift pedal 42 thus controlling the actuator 22. The pedal angle sensor 88 outputs "0" when the shift pedal 42 is not operated, and outputs a positive value corresponding to a pedal angle (absolute value), for example.

Further, the control means 24 includes an oil pressure decision means 90, the shift start preparation means 30, the shift start means 32, and the actuator control means 26.

The oil pressure decision means 90 includes a data memory in which an oil pressure value map is registered. In the oil pressure value map, proper oil pressure values corresponding to the outputs of the shift position sensor 80, the engine rotational speed sensor 82 and the throttle opening sensor 84 are arranged. The oil pressure decision means 90 decides an oil pressure value to be set when the shift start is prepared (third oil pressure value p3: see FIG. 4) based on the detection values from the respective sensors and the oil pressure value map.

To decide the third oil pressure value p3, the following method may be adopted. More specifically, an engine torque map in which the relationship among an engine rotational speed, throttle opening and a generation torque of the engine is written, and a torque oil pressure conversion map in which the relationship between a friction torque of the clutch 20 and a clutch oil pressure is written are registered in a data memory.

The oil pressure decision means 90 may decide the third oil pressure value p3 in such a manner that the engine generation torque is obtained based on the respective sensor values and the maps, the engine generation torque is converted into an oil pressure value (fourth oil pressure value p4: see FIG. 4) at which a friction torque of the clutch 20 becomes an engine torque×a primary gear change ratio, and a predetermined oil pressure value is deducted from the fourth oil pressure value p4 to decide the oil pressure value p3. The predetermined oil pressure value is a value for preventing the third oil pressure value p3 from becoming the first oil pressure value p1 or less when the predetermined oil pressure value is deducted from the fourth oil pressure value p4.

The shift start preparation means 30 outputs a first control signal Sc1 to the actuator control means 26 at a point in time wherein a value of the pedal angle sensor 88 exceeds 20% or more and 30% or less of a value corresponding to an operational angle for performing the shift start (second threshold value A2). For example, the shift start preparation means 30 outputs a first control signal Sc to the actuator control means 26 at a point of time that the value of the pedal angle sensor 88 exceeds 25% (first threshold value A1). Due to such an operation, the shift control device 10 enters the preparation of the shift start.

The shift start means 32 outputs a second control signal Sc2 to the actuator control means 26 at a point in time wherein the value of the pedal angle sensor 88 exceeds a value corresponding to the operational angle for performing the shift start (second threshold value A2). Due to such an operation, the shift start is performed. More specifically, the clutch 20 is disengaged and, thereafter, the shift position of the transmission 16 is changed to an arbitrary position including a neutral position corresponding to an operation of the shift pedal 42.

The actuator control means 26 controls, during the normal traveling, the actuator 22 such that a value of the clutch oil pressure sensor 86 becomes a oil pressure value p1 at which a friction torque of the clutch 20 becomes a maximum. When the first control signal Sc1 is supplied to the actuator control means 26 from the shift start preparation means 30, during a period in which the first control signal Sc1 is supplied to the actuator control means 26, the actuator control means 26 controls the actuator 22 such that a clutch oil pressure in the hydraulic pipe 46 becomes the oil pressure value (third oil pressure value p3) which is decided by the oil pressure decision means 90. To control the actuator 22 such that the clutch oil pressure becomes the third oil pressure value p3, a known technique such as a PID control or the like, for example, may be used.

Thereafter, when a second control signal Sc2 is supplied to the actuator control means 26 from the shift start means 32, the actuator control means 26 controls the actuator 22 such that the clutch oil pressure in the hydraulic pipe 46 becomes a second oil pressure value p2. Due to such a control, the clutch 20 is disengaged, and a shift position of the transmission 16 is changed in response to a shift operation performed by a rider after the disengagement of the clutch 20.

As a matter of course, when the operation of the shift pedal 42 is not performed in the shift start preparation stage, the supply of the first control signal Sc1 is stopped (the second control signal Sc2 is also not being supplied). Thus, the actuator control means 26 returns to a control performed during the normal travelling in which the actuator 22 is controlled such that a value of the clutch oil pressure sensor 86 assumes the first oil pressure value p1 at which a friction torque of the clutch 20 becomes maximum.

Figure 7:
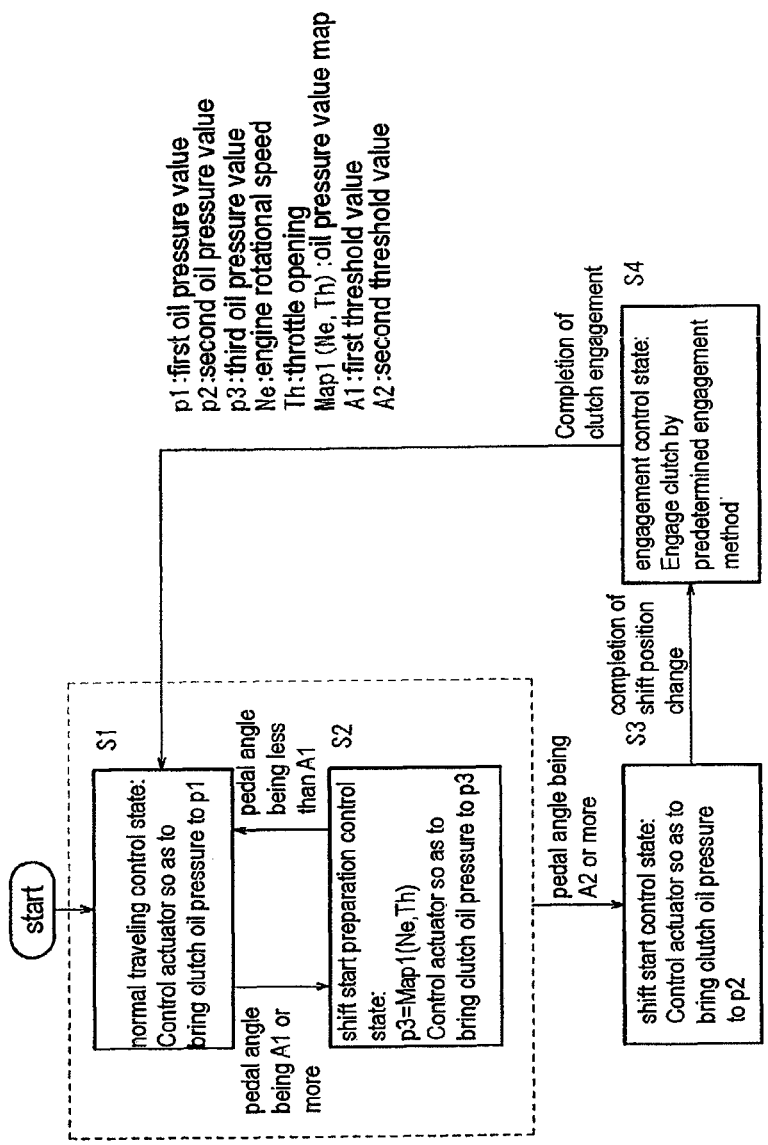
FIG. 7 illustrates a state transition diagram showing the manner of operation of the shift control device according to the embodiment.
Figure 8:
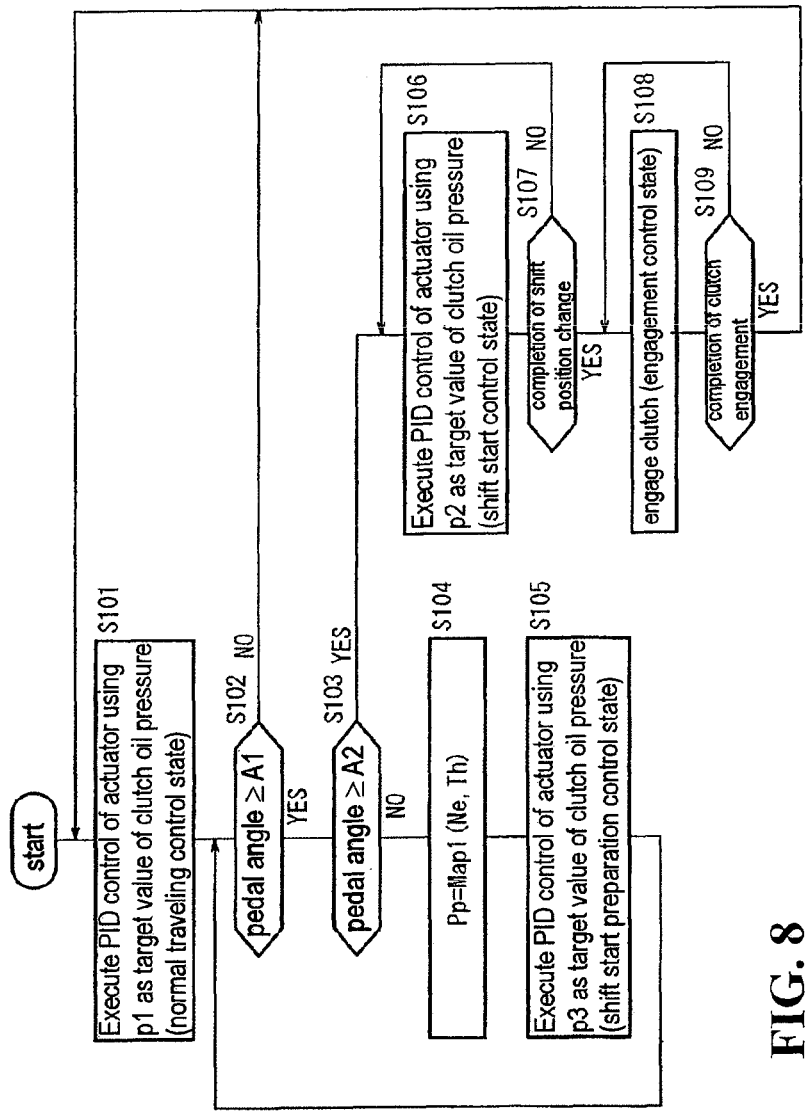
FIG. 8 illustrates a flowchart showing the manner of operation of the shift control device according to the embodiment.

Next, the manner of operation of the shift control device 10 according to the another embodiment is specifically explained in conjunction with a state transition diagram shown in FIG. 7 and a flowchart shown in FIG. 8.

In step S1 shown in FIG. 7 (step S101 shown in FIG. 8), a vehicle is in a normal traveling control state. In this control state, the actuator 22 is controlled such that the clutch oil pressure assumes the first oil pressure p1 at which a friction torque of the clutch 20 becomes maximum, for example, 0 Mpa.

When a rider places his/her foot on the shift pedal 42 or the like so that the pedal angle of the shift pedal 40 becomes larger than a first threshold value A1($\theta$1), the processing advances to step S2 shown in FIG. 7, and the normal traveling control state is changed to a shift start preparation state. The first threshold value A1($\theta$1) is, by taking a play, size accuracy and the like of the shift pedal 42 into consideration, set to a predetermined value larger than a maximum value of the pedal angle when the shift pedal 42 is not operated and less than a second threshold value A2($\theta$2) which is a pedal angle by which the shift control start is decided, for example, 2°.

In the shift start preparation control state in step S2 shown in FIG. 7, firstly, an oil pressure value map Map1 is retrieved based on an engine rotational speed Ne and throttle opening Th thus obtaining a third oil pressure value p3. Then, the actuator 22 is controlled so that the clutch oil pressure value becomes equal to the third oil pressure value p3. In the flowchart shown in FIG. 8, the processing advances to step S104 by way of step S102 and step S103, and further advances to step S105 by way of step S104, and the processing in step S105 is executed.

When the vehicle is in the shift start preparation control state and the pedal angle becomes the second threshold value A2($\theta$2) or more, it is determined that the shift operation is performed, and the shift start preparation control state is changed to the shift start control state in step S3 shown in FIG. 7 (step S106 shown in FIG. 8).

On the other hand, when the vehicle is in the shift start preparation control state and the pedal angle becomes the first threshold value A1($\theta$1) or less, it is determined that the shift operation is interrupted, and the shift start preparation control state is changed to the normal travelling control state in step S1 shown in FIG. 7 (step S101 shown in FIG. 8). The second threshold value A2(θ2) of the pedal angle is set to a value which allows the shift control device 10 to determine that the rider surely performs the shift operation, for example, 5°.

In the shift start control state in step S3 shown in FIG. 7 (step S106 shown in FIG. 8), the actuator 22 is controlled such that the clutch oil pressure becomes the second oil pressure value p2 at which the friction torque of the clutch 20 becomes approximately 0, for example, 1 Mpa. Due to such a control, the clutch 20 is brought into a disengagement state. The processing in step S3 shown in FIG. 7 (step S106 in FIG. 8) is performed until the change of the shift position is completed (step S107 shown in FIG. 8).

When it is detected that the shift position of the transmission 16 is changed in the shift start control state, the shift start control state is changed to the engagement control state in step S4 shown in FIG. 7 (step S108 shown in FIG. 8). In the engagement control state, the engagement of the clutch is performed using a conventional technique. The processing in step S4 shown in FIG. 7 (step S108 shown in FIG. 8) is executed until the clutch engagement is completed (step S109 shown in FIG. 8).

When the engagement of the clutch 20 is completed in the engagement control state, the engagement control state is changed to the normal travelling control state in step S1 shown in FIG. 7 (step S101 shown in FIG. 8).

The difference between the manner of operation of the shift control device of a comparison example and the manner of operation of the shift control device 10 of the above-mentioned embodiment is hereinafter explained.

Although the shift control device of the comparison example has the substantially equal constitution as the shift control device 10 of the embodiment, the shift control device of the comparison example differs from the shift control device 10 of the embodiment with respect to a point that the shift control device of the comparison example has no shift start preparation means 30. Accordingly, the first control signal Sc1 is not supplied to the actuator control means 26 and only the second control signal Sc2 is supplied to the actuator control means 26.

Figure 9:
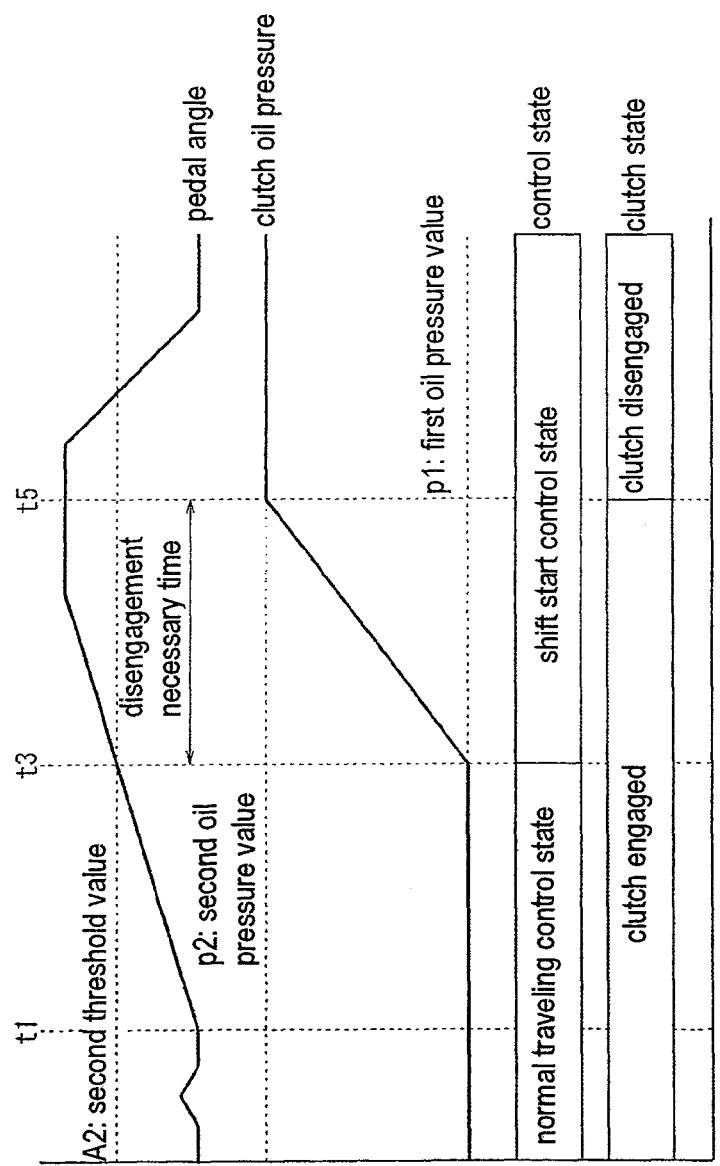
FIG. 9 illustrates a timing chart showing the manner of operation of a shift control device according to a comparison example.

The manner of operation of the shift control device of the comparison example is explained in conjunction with FIG. 9.

At a point in time t1, a rider starts a shift operation. When the pedal angle exceeds a pedal angle (second threshold value A2) at which the shift control is started at a point of time t3, a control state is changed to the shift start control state and a control for disengaging the clutch 20 is started. However, an operational speed of the actuator 22 is limited. Thus, the clutch 20 is not readily disengaged whereby the clutch oil pressure assumes the first oil pressure value p1 at a point in time t3. Thereafter, the clutch oil pressure is gradually elevated and reaches the second oil pressure value p2 at a point in time t5 so that the clutch 20 assumes a disengagement state. The time necessary for the disengagement of the clutch 20 is t5-t3.

Figure 10:
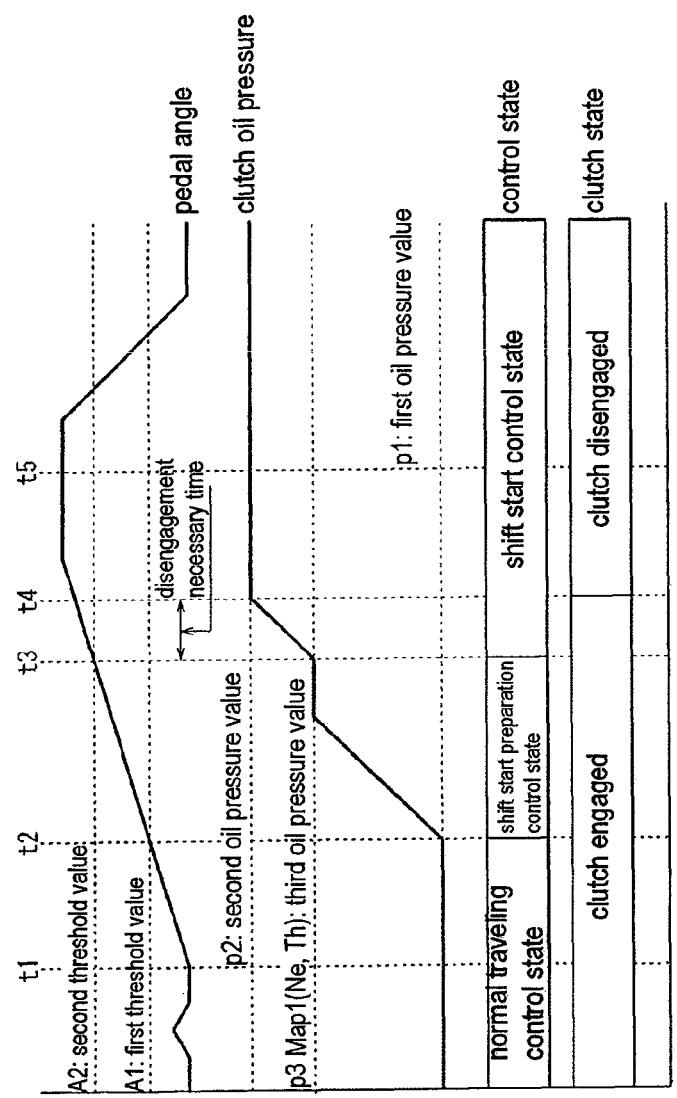
FIG. 10 illustrates a timing chart showing the manner of operation of the shift control device according to the embodiment.

The manner of operation of the shift control device 10 of this embodiment is explained in conjunction with FIG. 10.

At a point in time t1, a rider starts a shift operation. When the pedal angle exceeds a first threshold value A1 at a point of time t2, a control is performed so as to change the normal traveling control state to the shift start preparation control state so that the clutch oil pressure assumes a third oil pressure value p3. Subsequently, when the pedal angle exceeds a second threshold value A2 at a point in time t3, a control is started so as to change the shift start preparation control state to the shift start control state so that the clutch 20 is disengaged. The clutch oil pressure assumes the third oil pressure value p3 which is higher than the first oil pressure value p1 at a point in time t3. Thus, the clutch oil pressure can reach the second oil pressure value p2 earlier than the case shown in FIG. 9 so that the clutch 20 is brought into the disengagement state at a point of time t4 which is earlier than a point in time t5. The time necessary for disengagement of the clutch 20 (disengagement necessary time) is t4-t3 so that this disengagement necessary time is shorter than the disengagement necessary time (t5-t3) in the case shown in FIG. 9.

In the above-mentioned embodiment, an example in which the oil pressure is used for the shift control has been described. In addition to such an example, a liquid which has a fixed viscosity for suppressing the generation of rusts on equipment may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control device comprising:
an engine;
a transmission for transmitting power generated by the engine to a drive wheel;
a shift operation means for operation by a rider for changing a shift position of the transmission;
a clutch for connecting/disconnecting the power transmitted to the drive wheel from the engine;
an actuator for performing an engagement/disengagement operation of the clutch; and
a control means for controlling driving of the actuator, wherein
the control means includes:
an operation quantity detection means for detecting an operation quantity of the shift operation means;
a shift start preparation means for driving the actuator at a stage wherein an operation quantity detected by the operation quantity detection means exceeds a first threshold value so as to perform a control for bringing the clutch into a predetermined position between an engagement position and a half clutch position; and
a shift start means for driving the actuator at a stage wherein the operation quantity detected by the operation quantity detection means exceeds a second threshold value larger than the first threshold value so as to perform the disengagement of the clutch.

2. The shift control device according to claim 1, further comprising:
a rotational speed sensor for detecting a rotational speed of the engine; and
a throttle opening sensor for detecting an opening of a throttle; wherein
the predetermined position is set based on at least a detection value of the rotational speed sensor and a detection value of the throttle opening sensor.

3. The shift control device according to claim 2, further comprising:
a hydraulic pipe for connecting the actuator and the clutch; and
a liquid pressure sensor for detecting liquid pressure value in the hydraulic pipe, wherein
an operational force of the actuator is transmitted to the clutch via liquid pressure in the hydraulic pipe, and the predetermined position is determined in response to the liquid pressure value detected by the liquid pressure sensor.

4. The shift control device according to claim 3, wherein assuming the liquid pressure value corresponding to an engagement position of the clutch as a first liquid pressure value, the liquid pressure value corresponding to a disengagement position of the clutch as a second liquid pressure value, the liquid pressure value corresponding to the predetermined position as a third liquid pressure value, and a liquid pressure value at which a frictional torque of the clutch becomes equal to a torque which the engine generates as a fourth liquid pressure value,
- the third liquid pressure value is a liquid pressure value between the first liquid pressure value and the fourth liquid pressure value, and is the liquid pressure value different from the first liquid pressure value and the fourth liquid pressure value.

5. The shift control device according to claim 1, wherein
- the shift operation means is a shift pedal operated by a foot of the rider or a shift lever which is operated by a hand of the rider, and
- the operation quantity detection means detects any one of an operational displacement distance, an operational displacement angle and an operational force of the shift operation means.

6. The shift control device according to claim 2, wherein
- the shift operation means is a shift pedal operated by a foot of the rider or a shift lever which is operated by a hand of the rider, and
- the operation quantity detection means detects any one of an operational displacement distance, an operational displacement angle and an operational force of the shift operation means.

7. The shift control device according to claim 6, further comprising:
- a hydraulic pipe for connecting the actuator and the clutch; and
- a liquid pressure sensor for detecting liquid pressure value in the hydraulic pipe, wherein
- an operational force of the actuator is transmitted to the clutch via liquid pressure in the hydraulic pipe, and
- the predetermined position is determined in response to the liquid pressure value detected by the liquid pressure sensor.

8. The shift control device according to claim 7, wherein assuming the liquid pressure value corresponding to an engagement position of the clutch as a first liquid pressure value, the liquid pressure value corresponding to a disengagement position of the clutch as a second liquid pressure value, the liquid pressure value corresponding to the predetermined position as a third liquid pressure value, and a liquid pressure value at which a frictional torque of the clutch becomes equal to a torque which the engine generates as a fourth liquid pressure value,
- the third liquid pressure value is a liquid pressure value between the first liquid pressure value and the fourth liquid pressure value, and is the liquid pressure value different from the first liquid pressure value and the fourth liquid pressure value.

9. The shift control device according to claim 5, further comprising:
- a hydraulic pipe for connecting the actuator and the clutch; and
- a liquid pressure sensor for detecting liquid pressure value in the hydraulic pipe, wherein
- an operational force of the actuator is transmitted to the clutch via liquid pressure in the hydraulic pipe, and
- the predetermined position is determined in response to the liquid pressure value detected by the liquid pressure sensor.

10. The shift control device according to claim 9, wherein assuming the liquid pressure value corresponding to an engagement position of the clutch as a first liquid pressure value, the liquid pressure value corresponding to a disengagement position of the clutch as a second liquid pressure value, the liquid pressure value corresponding to the predetermined position as a third liquid pressure value, and a liquid pressure value at which a frictional torque of the clutch becomes equal to a torque which the engine generates as a fourth liquid pressure value,
- the third liquid pressure value is a liquid pressure value between the first liquid pressure value and the fourth liquid pressure value, and is the liquid pressure value different from the first liquid pressure value and the fourth liquid pressure value.

11. The shift control device according to claim 1, further comprising:
- a hydraulic pipe for connecting the actuator and the clutch; and
- the liquid pressure sensor for detecting liquid pressure value in the hydraulic pipe, wherein
- an operational force of the actuator is transmitted to the clutch via liquid pressure in the hydraulic pipe, and
- the predetermined position is determined in response to the liquid pressure value detected by the liquid pressure sensor.

12. The shift control device according to claim 11, wherein assuming the liquid pressure value corresponding to an engagement position of the clutch as a first liquid pressure value, the liquid pressure value corresponding to a disengagement position of the clutch as a second liquid pressure value, the liquid pressure value corresponding to the predetermined position as a third liquid pressure value, and a liquid pressure value at which a frictional torque of the clutch becomes equal to a torque which the engine generates as a fourth liquid pressure value,
- the third liquid pressure value is a liquid pressure value between the first liquid pressure value and the fourth liquid pressure value, and is the liquid pressure value different from the first liquid pressure value and the fourth liquid pressure value.

13. A shift control device comprising:
- an engine;
- a transmission for transmitting power generated by the engine to a drive wheel;
- a manually operated shift operator for changing a shift position of the transmission;
- a clutch for connecting/disconnecting the power transmitted to the drive wheel from the engine;
- an actuator for performing an engagement/disengagement operation of the clutch; and
- a controller for controlling the actuator, comprising:
- an operation quantity detector for detecting an operation quantity of the shift operation;
- a shift starter for driving the actuator at a stage wherein an operation quantity detected by the operation quantity detector exceeds a first threshold value so as to perform a control for bringing the clutch into a predetermined position between an engagement position and a half clutch position; and
- a shift starter for driving the actuator at a stage wherein the operation quantity detected by the operation quantity detector exceeds a second threshold value larger than the first threshold value so as to perform the disengagement of the clutch.

14. The shift control device according to claim 13, further comprising:
- a rotational speed sensor for detecting a rotational speed of the engine; and
- a throttle opening sensor for detecting an opening of a throttle; wherein
- the predetermined position is set based on at least a detection value of the rotational speed sensor and a detection value of the throttle opening sensor.

15. The shift control device according to claim 14, wherein the shift operator is a shift pedal or a shift lever, and
the operation quantity detector detects any one of an operational displacement distance, an operational displacement angle and an operational force of the shift operator.

16. The shift control device according to claim 14, further comprising:
- a hydraulic pipe for connecting the actuator and the clutch; and
- a liquid pressure sensor for detecting a liquid pressure value in the hydraulic pipe, wherein
- an operational force of the actuator is transmitted to the clutch via liquid pressure in the hydraulic pipe, and
- the predetermined position is determined in response to the liquid pressure value detected by the liquid pressure sensor.

17. The shift control device according to claim 14, wherein assuming the liquid pressure value corresponding to an engagement position of the clutch as a first liquid pressure value, the liquid pressure value corresponding to a disengagement position of the clutch as a second liquid pressure value, the liquid pressure value corresponding to the predetermined position as a third liquid pressure value, and a liquid pressure value at which a frictional torque of the clutch becomes equal to a torque which the engine generates as a fourth liquid pressure value,
the third liquid pressure value is a liquid pressure value between the first liquid pressure value and the fourth liquid pressure value, and is the liquid pressure value different from the first liquid pressure value and the fourth liquid pressure value.

18. The shift control device according to claim 13, wherein the shift operator is a shift pedal or a shift lever, and
the operation quantity detector detects any one of an operational displacement distance, an operational displacement angle and an operational force of the shift operator.

19. The shift control device according to claim 13, further comprising:
- a hydraulic pipe for connecting the actuator and the clutch; and
- a liquid pressure sensor for detecting a liquid pressure value in the hydraulic pipe, wherein
- an operational force of the actuator is transmitted to the clutch via liquid pressure in the hydraulic pipe, and
- the predetermined position is determined in response to the liquid pressure value detected by the liquid pressure sensor.

20. The shift control device according to claim 13, wherein assuming the liquid pressure value corresponding to an engagement position of the clutch as a first liquid pressure value, the liquid pressure value corresponding to a disengagement position of the clutch as a second liquid pressure value, the liquid pressure value corresponding to a predetermined position as a third liquid pressure value, and a liquid pressure value at which a frictional torque of the clutch becomes equal to a torque which the engine generates as a fourth liquid pressure value,
the third liquid pressure value is a liquid pressure value between the first liquid pressure value and the fourth liquid pressure value, and is a liquid pressure value different from the first liquid pressure value and the fourth liquid pressure value.

* * * * *